(12) United States Patent
Giering et al.

(10) Patent No.: US 7,954,908 B2
(45) Date of Patent: Jun. 7, 2011

(54) PEDAL SIMULATION DEVICE

(75) Inventors: Wilfried Giering, Mendig (DE); Erwin Michels, Kail (DE); Benedikt Ohlig, Vallendar (DE); Herbert Steinheuer, Bad Neuenahr (DE)

(73) Assignee: Lucas Automotive GmbH (DE)

( * ) Notice: Subject to any disclaimer, the term of this patent is extended or adjusted under 35 U.S.C. 154(b) by 562 days.

(21) Appl. No.: 12/150,412

(22) Filed: Apr. 28, 2008

(65) Prior Publication Data
US 2008/0245179 A1 Oct. 9, 2008

Related U.S. Application Data

(63) Continuation of application No. 11/151,142, filed on Jun. 13, 2005, now abandoned, which is a continuation of application No. PCT/EP03/13583, filed on Dec. 2, 2003.

(30) Foreign Application Priority Data

Dec. 13, 2002 (DE) .................................. 102 60 008

(51) Int. Cl.
*B60T 13/66* (2006.01)
(52) U.S. Cl. ............................................ 303/20; 60/553
(58) Field of Classification Search .................. 303/3, 4, 303/20; 74/512, 514, 560; 60/552, 553
See application file for complete search history.

(56) References Cited

U.S. PATENT DOCUMENTS

| | | | | |
|---|---|---|---|---|
| 5,031,971 | A * | 7/1991 | Boehm et al. | 303/114.3 |
| 5,106,167 | A * | 4/1992 | Matsuda | 303/15 |
| 5,567,021 | A * | 10/1996 | Gaillard | 303/3 |
| 6,135,572 | A * | 10/2000 | Worsdorfer et al. | 303/10 |
| 6,471,304 | B1 * | 10/2002 | Deml et al. | 303/113.4 |
| 6,877,821 | B2 * | 4/2005 | Yokoyama et al. | 303/115.2 |

FOREIGN PATENT DOCUMENTS

| | | | |
|---|---|---|---|
| DE | 19638102 C1 * | 8/1997 | |
| DE | 19755481 A1 * | 6/1999 | |
| DE | 10039670 A1 * | 3/2002 | |
| EP | 771705 A1 * | 5/1997 | |
| EP | 1142766 A1 * | 10/2001 | |

* cited by examiner

*Primary Examiner* — Thomas J Williams
(74) *Attorney, Agent, or Firm* — MacMillan, Sobanski & Todd, LLC

(57) ABSTRACT

The invention relates to a pedal simulation device for simulating the reaction behavior of a pedal, in particular of a brake pedal of a vehicle brake system, comprising a cylinder, a piston disposed displaceably inside the cylinder and coupled to the pedal and delimiting a working chamber inside the cylinder, a resetting element which, upon an actuation of the pedal, exerts a resetting force on the pedal, and a modelling device, which is fluidically connected to the working chamber, for influencing the reaction behavior of the pedal. In the invention, for achieving the reaction behavior it is provided that, upon an actuation of the pedal, by means of the modelling device a vacuum, which is arising or has arisen in the working chamber, is built up.

13 Claims, 3 Drawing Sheets

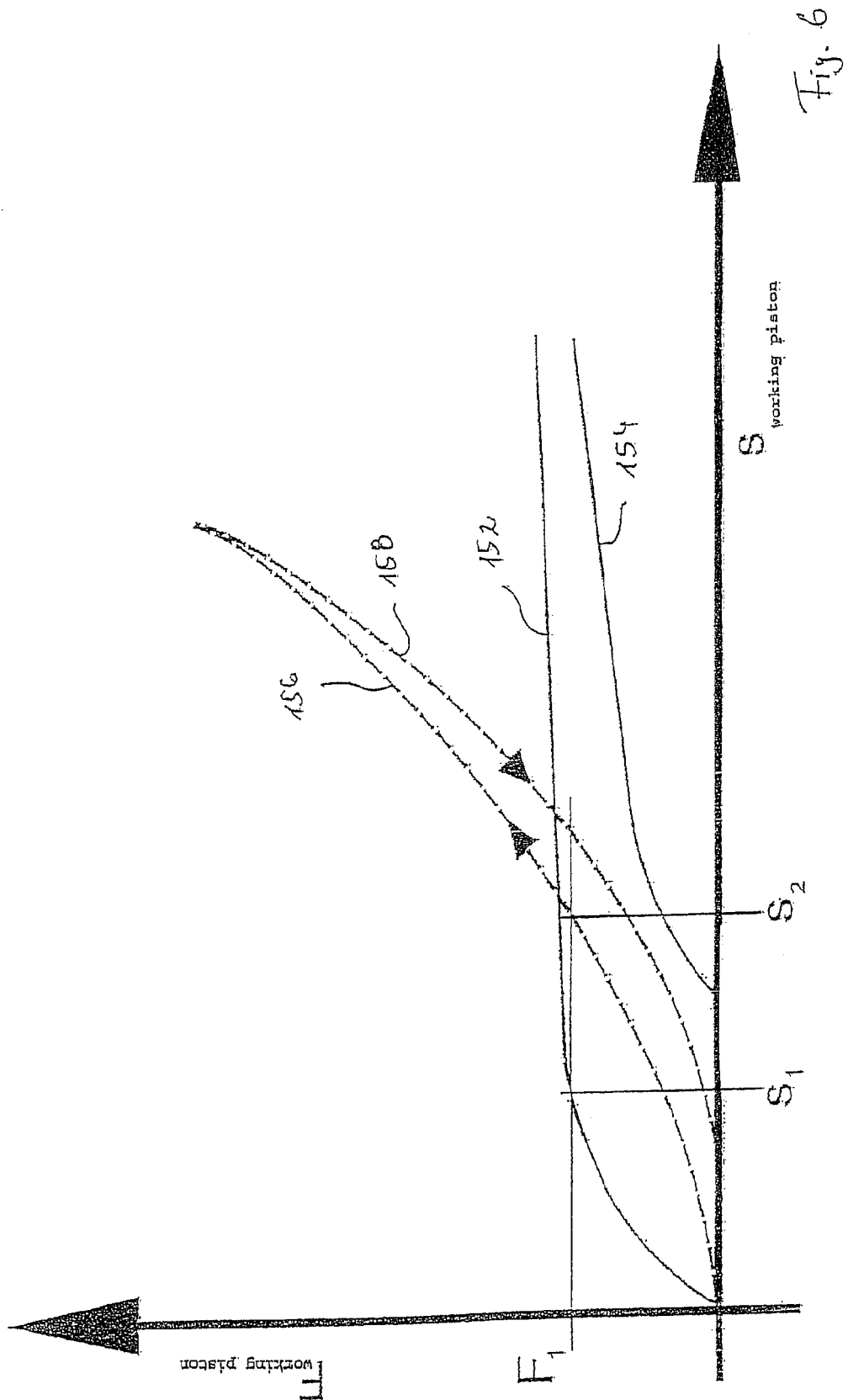

PEDAL SIMULATION DEVICE

CROSS REFERENCE TO RELATED APPLICATIONS

This application is a continuation of U.S. patent application Ser. No. 11/151,142, filed Jun. 13, 2005 which is a continuation of International Application No. PCT/EP03/13583 filed Dec. 2, 2003, and which claimed priority to German Patent Application No. 102 60 008.2 filed Dec. 13, 2002, the disclosures of all of which are incorporated herein by reference.

BACKGROUND

The invention relates to a pedal simulation device for simulating the reaction behavior of a pedal, in particular of a brake pedal of a vehicle brake system, comprising a cylinder, a piston disposed displaceably inside the cylinder and coupled to the pedal and delimiting a working chamber inside the cylinder, a resetting element capable of exerting a resetting force on the pedal, and a modeling device, which is fluidically connected to the working chamber, for influencing the reaction behavior of the pedal.

Such pedal simulation devices are already used in vehicles where an electrohydraulic brake system or an electromotive brake system is uncoupled from the brake force generation by means of a brake pedal. Such brake systems are referred to as "brake-by-wire" vehicle brake systems since the actual electrohydraulic or electromotive brake system that produces the braking effect is mechanically uncoupled from the brake pedal that initiates the braking operation. Rather, a brake pedal actuation is detected electronically by means of suitable sensors from various parameters, such as e.g., the actual brake pedal displacement or the force applied to the brake pedal as well as the brake pedal acceleration, and the respective brake system is controlled in accordance with the detected variables. In order nevertheless to convey to the driver of a motor vehicle a familiar mechanical brake pedal characteristic, whereby the brake pedal, upon actuation thereof, with increasing travel provides a growing resistance to further actuation and whereby the brake pedal in accordance with a hysteresis, upon release of the pedal, returns in a damped manner to its normal position, the pedal simulation devices of the initially described type are used.

Such a pedal simulation device is known, for example, from DE 100 39 670 A1. With this pedal simulation device, upon actuation of the brake pedal, the piston connected thereto by a connecting rod is displaced in the cylinder. In the process, gas is pressed by means of a throttle device out of a working chamber that is enclosed by the cylinder and the piston. With the aid of the throttle device it is possible to influence the discharge behaviour of the gas and hence the resistance that arises during a movement of the piston inside the cylinder. It has however emerged that the pedal simulation device according to this background art has a relatively sluggish response characteristic. The reason for this is that, because of the high compressibility of the gas, the piston may move a relatively long way inside the cylinder without a sufficiently high resistance that is perceptible by the driver of the motor vehicle being offered to this movement on account of the compression of the gas and the effect of the throttle. It is only after the piston has been displaced by a considerable distance that the pressure increase inside the cylinder is sufficient to generate a perceptible resistance to the pedal actuation. The driver accordingly has the unwanted impression that the brake system only becomes active relatively late.

From DE 197 55 481 C2 a pedal simulation device similar to the previously described background art is known. This device provides that, upon an actuation of the brake pedal, the gas enclosed between the piston and the cylinder may pass out of the working chamber in a substantially unimpeded manner through a non-return valve, wherein a resistance to the pedal movement is summoned up by means of a spring. During the resetting movement of the pedal, on the other hand, a throttle element, through which gas may pass in an inhibited manner into the working chamber enclosed by the piston and the cylinder, is effective so that a hysteresis is imposed on the movement of the brake pedal and the brake pedal may move under the action of the resetting spring in a damped manner into its normal position. However, the motional characteristic of this pedal simulation device differs widely from the desired behavior, especially because of the spring, which conveys to the driver a resistance to his pedal actuation that remains constant.

From EP 0 771 705 B1, moreover, a brake pedal simulation device is known, in which the piston moves in a cylinder that is closed at both ends, so that the piston delimits a working chamber at each end. Provided in the piston is a bore that enables an ex-change of gas between the two chambers inside the cylinder. Upon actuation of the brake pedal, the piston moves inside the cylinder, wherein gas from the one working chamber may flow through the piston into the other working chamber. This leads however to inadequate damping of the piston movement, so that the resulting brake pedal characteristic differs widely from the one to be conveyed to the driver.

Finally, from DE 196 38 102 C1 a vehicle hydraulic brake system is known, in which the basic idea of uncoupling of the brake pedal from the actual brake system is realized.

BRIEF SUMMARY

An object of the present invention is to provide a pedal simulation device of the initially described type, which, while being of a simple construction and operationally reliable, responds rapidly and has an improved pedal characteristic compared to the background art.

This object is achieved by a pedal simulation device for simulating the reaction behavior of a pedal, in particular of a brake pedal of a vehicle brake system, comprising a cylinder, a piston disposed displaceably inside the cylinder and coupled to the pedal and delimiting a working chamber inside the cylinder, a resetting element capable of exerting a resetting force on the pedal, and a modeling device, which is fluidically connected to the working chamber, for influencing the reaction behavior of the pedal. With this pedal simulation device, according to the invention it is provided that, upon an actuation of the pedal, a vacuum builds up in the working chamber.

The vacuum that builds up in the working chamber upon actuation of the brake pedal is dependent on the behavior of the modeling device and is reducible by means of a fluid flowing through the modeling device. Because of the preferably relatively small (dead) volume of the working chamber at the start of actuation of the pedal, this vacuum may assume a relatively large value within a relatively short time of the pedal actuation, i.e. after a relatively short actuating distance, so that the pedal simulation device responds rapidly. The modeling device then allows only a limited replenishing flow of fluid into the working chamber, with the result that the pedal is actuable only with appropriate resistance. Upon release of the pedal, the pedal is returned to its normal position by the resetting element, which may be of any desired configuration, wherein this resetting movement is likewise influenceable by the modeling device.

As a fluid, according to the invention suitable liquids, such as e.g. brake fluid or glycerol, may be used. The invention is however particularly suitable for use also in a pneumatic system, so that as a fluid it is possible to use a gas or gas mixture, in particular air, the compressibility and expansibility of which is utilized. In the following, therefore, the invention is discussed in particular with regard to the use of a gaseous fluid.

According to the invention, it may be provided that the modeling device connects the working chamber to the ambient atmosphere. Alternatively, it may also be provided that the modeling device connects the working chamber to a fluid reservoir that is separated or separable from the ambient atmosphere. It is advantageous for the fluid, upon actuation of the pedal, to flow from outside of the cylinder into the working chamber.

In order to achieve the damping effect of the modeling device, according to the invention it may be provided that the modeling device comprises at least one throttle channel having a throttle device. This throttle device may be a pre-configured throttle device. On the other hand, in a development of the invention it is provided that the throttle device is adjustable. The throttle device may be adjusted manually during the original assembly and during maintenance of the brake system. It is however also equally possible for the throttle device to be actively controlled and adjusted during operation of the vehicle brake system, e.g. in such a way that in dependence upon various operating states of the brake system or driving situations the throttle device may assume different states and therefore convey to the driver different braking characteristics that also differ in each case in dependence upon the operation of the vehicle brake system.

Furthermore, in a development of the invention the modeling device may comprise a bypass channel that bypasses the throttle channel. It is therefore possible that, upon a release of the pedal after actuation thereof, under the action of the resetting element fluid flows out of the working chamber through the bypass channel. This means that an actuation of the pedal is counteracted by an appropriately high resistance owing to the throttle device but that, upon release of the pedal after prior actuation, the throttle device may be substantially bypassed so that the resetting movement may be effected with markedly weakened damping and hence ultimately faster. A hysteresis is therefore imposed on the pedal movement. This may be achieved, for example, in that the by-pass channel has a non-return valve that allows fluid to pass substantially unimpeded out of the working chamber and prevents fluid from passing into the working chamber. The use of a non-return valve has the advantage that it is a relatively simple and hence inexpensively available, operationally reliable component.

In a development of the pedal simulation device according to the invention, it is provided that the cylinder is closed at its end remote from the working chamber and together with the piston encloses a complementary working chamber and that, upon an actuation of the brake pedal, fluid from the complementary working chamber flows out of the cylinder through the modeling device. This measure provides that in addition to the working chamber a further working chamber, namely the complementary working chamber, is provided, by means of which the behavior of the brake pedal may be further influenced. The modeling device accordingly comprises components, which are associated with the working chamber, and further components, which are associated with the complementary working chamber.

When in this connection there is mention of a modeling device, this term is not necessarily intended to mean that all of the components provided for influencing the reaction behavior of the pedal are combined in a common assembly group. Rather, the term modeling device is intended to be a generic term for the components that may influence the reaction behavior of the pedal, irrespective of whether they are combined in a common assembly group or associated in each case separately with the working chamber or the complementary working chamber.

It may also be provided with regard to the complementary working chamber that this chamber is connected by the modeling device to the ambient atmosphere, or that this chamber is alternatively connected by the modeling device to a fluid reservoir that is separated or separable from the ambient atmosphere.

Furthermore, in an analogous manner to the components of the modeling device that are associated with the working chamber it may be provided that the modeling device also comprises at least one throttle channel associated with the complementary working chamber and having a throttle device, wherein this throttle device associated with the complementary working chamber may also be sporadically or permanently controllable and hence adjustable. Equally, the modeling device may also comprise a bypass channel, which is associated with the complementary working chamber and by means of which the throttle device associated with the complementary working chamber may be bypassed.

It should however be pointed out that the components associated with the complementary working chamber, namely the throttle device and bypass channel, may be disposed the opposite way round to the components of the working chamber according to the previous description. In other words, this means that, upon a release of the pedal after actuation thereof, under the action of the resetting element fluid flows into the complementary working chamber through the bypass channel. If, for example, as already explained above with regard to the working chamber—the actuation of the brake pedal is to be effected in a damped manner and the resetting movement is to occur only with slight damping, then in the context of this development of the invention it is provided that, upon actuation of the brake pedal, the fluid displaced from the complementary working chamber has to flow through the throttle device associated with the complementary working chamber and, in so doing, closes the non-return valve. Upon a sub-sequent release of the pedal, fluid then has to flow from the ambient atmosphere into the complementary working chamber. This occurs substantially through the non-return valve, which opens in this flow direction, so that only a small proportion of the fluid flowing into the complementary working chamber flows through the throttle device.

In a development of the invention it may further be provided that the working chamber and the complementary working chamber are connected by the modeling device, wherein, upon an actuation of the pedal, fluid from the complementary working chamber flows through the modeling device into the working chamber and wherein, upon a release of the pedal after actuation thereof, fluid from the working chamber flows through the modeling device into the complementary working chamber. In this variant of the invention, the modeling device may comprise a throttle device as well as a by-pass channel with non-return valve, wherein the non-return valve is oriented in such a way that, given a flow from the complementary working chamber into the working chamber, it blocks and, given a flow in the opposite direction, it opens. Consequently, upon an actuation of the pedal, the fluid is sucked out of the complementary working chamber, through the throttle device and into the working chamber, without any possibility of a fluid flow occurring through the bypass channel. After release of the pedal, the pedal and hence the piston in the cylinder are pushed back to their normal position under the action of the resetting element, wherein the fluid situated in the working chamber may flow through the bypass channel with the open non-return valve in a substantially unimpeded manner back into the complementary working chamber.

Other advantages of this invention will become apparent to those skilled in the art from the following detailed description of the various embodiments, when read in light of the accompanying drawings.

BRIEF DESCRIPTION OF THE DRAWINGS

FIG. 6 is a force/displacement diagram for a more detailed explanation of the pedal simulation device according to the invention and the background art.

DETAILED DESCRIPTION

Figure 1:
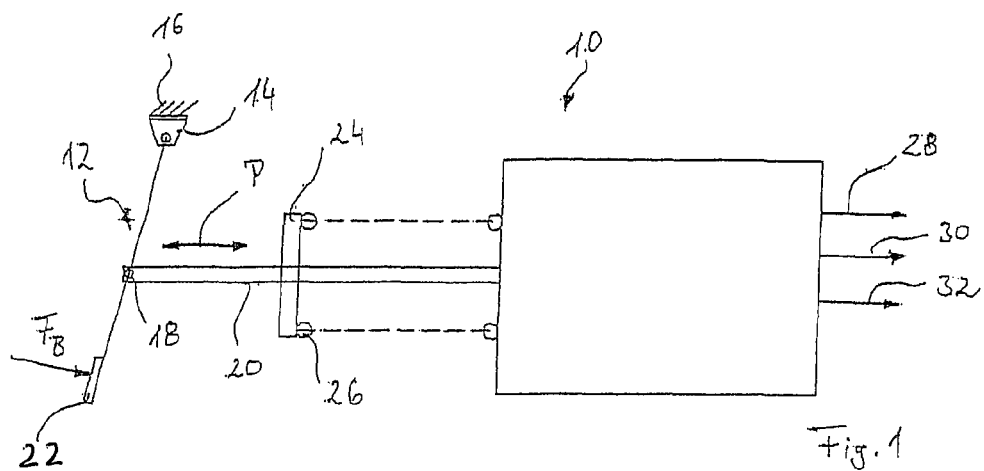
FIG. 1 is a diagrammatic overview representation of a pedal designed as a brake pedal.

FIG. 1 shows diagrammatically how a pedal simulation device 10 according to the invention, which in this described case is designed as a brake pedal simulation device, interacts with a brake pedal 12. The brake pedal 12 is attached in a rotatable manner to a suspension device 14 on a vehicle body 16 and coupled by a swivel joint 18 to an actuating rod 20 for joint movement. At its end remote from the suspension device 14, the brake pedal 12 has a bearing pad 22, on which a driver of a vehicle, in order to actuate the vehicle brake, exerts the brake actuating force $F_B$ by depressing the pad 22 with his foot. On completion of the braking operation, the driver reduces the brake actuating force $F_B$ and releases the brake pedal 12.

The actuating rod 20 runs into the diagrammatically illustrated pedal simulation device 10, which is described in detail below. On the actuating rod 20, a stop 24 is provided in a fixed manner. Supported against this stop is one end of a resilient resetting element in the form of a spring 26. The other end of the spring 26 is supported against the side of the housing of the pedal simulation device 10 facing the brake pedal 12. The spring 26, upon actuation of the brake pedal 12 and the thereby initiated sliding of the actuating rod 20 into the housing of the pedal simulation device 10, is compressed and, upon subsequent release of the brake pedal 12, gives rise to a resetting movement.

The pedal simulation device 10 comprises sensors (not shown in detail), by means of which parameters characterizing the actuation of the brake pedal 12, such as e.g. the actuating speed, the actuating distance or the magnitude of the pedal actuating force $F_B$, are detected and transmitted via the lines 28, 30, 32 to a control unit. The control unit then, in accordance with the detected parameters, subsequently controls the vehicle brake system, e.g. a hydraulic or electromechanical vehicle brake system (not shown in either case).

There now follows a detailed description of the construction and mode of operation of the pedal simulation device 10. For this purpose, reference is made to FIGS. 2 to 5, which show individual embodiments of the pedal simulation device 10.

Figure 2:
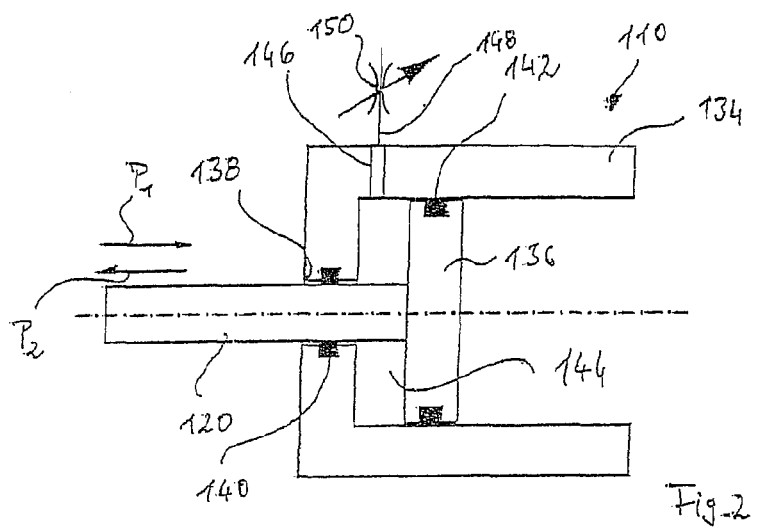
FIG. 2 is a detail view of the pedal simulation device according to a first embodiment of the present invention.

The first embodiment shown in FIG. 2 shows a pedal simulation device 110 comprising a cylinder 134, which is open at one end and has a working piston 136 guided therein. The working piston 136 is coupled to the actuating rod 120 for joint movement. The actuating rod 120 extends through an axial opening 138, wherein in the axial opening a sealing ring 140 is disposed. The effect achieved by the sealing ring 140 is that the actuating rod 120 may be moved axially back and forth in a fluid-tight manner inside the axial opening 138, as is represented in FIG. 2 by arrow P.

A sealing ring 142 is provided also at the peripheral surface of the working piston 136 facing the inner wall of the cylinder 134, so that the working piston 136 may also be moved back and forth in a fluid-tight manner inside the cylinder 134 together with the actuating rod 120.

The cylinder 134 together with the working piston 136 and the actuating rod 120 therefore enclose an annular working chamber 144. A radial opening 146 is introduced close to the sealed end of the cylinder 134 into the side wall thereof. The radial opening 146 communicates with a fluid line 148, with which a throttle device 150 is associated. The throttle device 150 is manually or electromechanically adjustable, thereby allowing a variation of the flow cross section of the fluid line 148 within a preset scope.

The working chamber 144 is filled with air and, upon opening of the fluid line 148 and/or the throttle device 150, communicates with the ambient atmosphere.

If the brake pedal 12 according to FIG. 1 is then actuated by the brake actuating force $F_B$, the actuating rod 120 is then displaced in accordance with arrow $P_1$ in FIG. 2 to the right. This leads to the piston 136 together with the actuating rod 120 moving inside the cylinder 134 in FIG. 2 to the right. The volume of the working chamber 144 is therefore increased, so that a vacuum arises therein. The effect of this vacuum is that the working chamber 144 takes in air from the ambient atmosphere through the radial opening 146, the fluid line 148 and the throttle device 150. The throttle device 150 however inhibits this intake of ambient air so that ultimately, by virtue of the vacuum arising in the working chamber 144, the movement of the actuating rod 120 and hence of the brake pedal 12 may occur only subject to resistance. In addition to the resistance generated by the spring 26 upon compression thereof, the driver perceives a resistance that originates from the development of the vacuum in the working chamber 144. In dependence upon the actuation of the brake pedal 12, i.e. in dependence upon the value of the applied brake actuating force $F_B$, the speed of actuation and the actuating distance of the brake pedal 12 as well as in dependence upon the throttle position of the throttle device 150, an amount of resistance arises in each case. It is therefore possible by means of the pedal simulation device 110 to convey to the driver a resistance characteristic for the actuation of the brake pedal 12 that allows the driver to believe that the brake pedal 12 is interacting directly with the brake system of the vehicle. In reality, however, the interaction occurs merely via sensors, which are not shown in FIGS. 1 and 2 and which—in accordance with, as such, known brake-by-wire brake systems—transmit parameters characterizing the actuation of the brake pedal 12 via the lines 28, 30 and 32 to a control unit, so that the brake system is then controlled electronically in accordance with the parameters.

Upon a release of the brake pedal 12 after actuation, i.e. upon a reduction of the brake actuating force $F_B$—in an extreme case to zero, the actuating rod 120 does not shoot suddenly from its deflected position into the normal position shown in FIG. 1. Rather, the resetting movement initiated by the spring 26 is also effected in a damped manner, because then the air situated in the working chamber 144 and pressed out of there by the action of the spring 26 has to be discharged into the ambient atmosphere again through the throttle device 150. In said case, the throttle device 150 in turn acts as a damping element, with the result that the resetting movement is effected in a retarded manner.

With the embodiment according to FIG. 2 it is possible, upon an actuation of the brake pedal 12, to achieve a sufficiently fast response of the pedal simulation device 110 because the vacuum arising in the working chamber 144 increases relatively quickly and the throttle device 150 leads to a rapidly growing resistance to the axial movement of the working piston 136. This may be gathered also from FIG. 6, which shows a diagram representing the resistance force $F_{working\ piston}$ arising at the working piston 136 over the displacement distance $S_{working\ piston}$ of the working piston 136.

If in FIG. 6 one examines, for example, the curve 152, which characterizes the embodiment according to FIG. 2 for a specific setting of the throttle device 150, then it is evident that, in order to achieve a specific resistance force $F_1$, a movement of the working piston by the distance $S_1$ is required. Up to attainment of this resistance force $F_1$ at the working piston 136, the resistance force rises relatively steeply in accordance with the curve 152. As the volume of the working chamber 144 increases, however, this rise levels out until it finally takes an asymptotic course. The curve 152 corresponds to the situation where at the start of an actuation of the brake pedal 12 there is a slight dead volume in the chamber 144 ($S_{working\ piston} \approx 0$). In the case of a larger dead volume at the start of an actuation of the brake pedal, the characteristic indicated by the curve 154 is obtained. The curve 154 shows an initially flatter rise.

FIG. 6 further shows two dashed curves representing the course of the resistance force at the working piston in systems according to the initially described background art according to DE 100 39 670 A1. In these systems, as already explained initially, the resistance force is generated, not by means of a vacuum, but by means of an above-atmospheric pressure generated in the cylinder by means of the displaced working piston. Thus, the curve 156 initially, i.e. given a small actuating distance, shows a markedly flatter rise than the curve 152, with the result that the working piston has to travel a much greater distance $S_2$ before the desired resistance force $F_1$ is attained at the working piston. Then, however, there is a much stronger rise in the resistance generated by the pedal simulation device. The curve 158 corresponds to the damping in the situation of return travel of the brake pedal. The area between the two curves 156 and 158 therefore corresponds to the hysteresis of a brake pedal actuating cycle.

The characteristic curves illustrated in FIG. 6 apply to the situation of constant actuating speed of the brake pedal 12. Given faster actuation, a greater resistance is offered to the actuation, and conversely. Such an actuating behavior is desirable because it corresponds to the usual actuating behavior of conventional brake systems with a vacuum brake booster. The reason for the actuating-speed-dependent characteristic course in the embodiment according to FIG. 2 is the fact that at a lower actuating speed a lower vacuum arises in the working chamber 144 than at a high actuating speed. The reason for this is the flow characteristic of the throttle device 150.

In summary, it may be stated with regard to FIG. 6 that the pedal simulation device according to the invention, which operates with a vacuum, responds more rapidly to an actuation of the brake pedal 12 than the pedal simulation devices according to the background art, which operate with above-atmospheric pressure.

Figure 3:
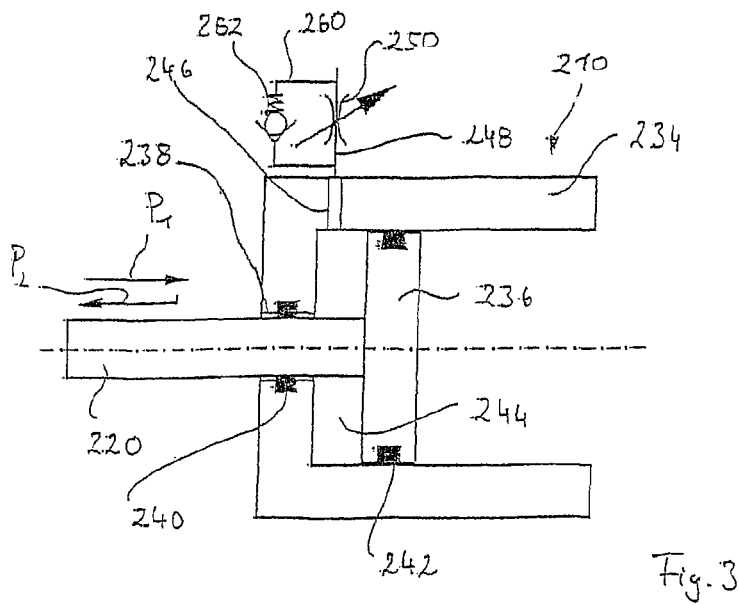
FIG. 3 is a detail view as in FIG. 2 according to a second embodiment of the present invention.

There now follows a description of the second embodiment of the pedal simulation device according to the invention, which is illustrated in FIG. 3. To simplify the description and avoid repetition, the same reference characters are used as with regard to FIGS. 1 and 2, only with the number "2" placed in front. Only the differences from the first embodiment according to FIG. 2 are described.

The second embodiment according to FIG. 3 differs from the first embodiment according to FIG. 2 only in that the fluid line 248, which is coupled to the radial opening 246, comprises a bypass line 260 that bypasses the throttle device 250. Provided in the bypass line 260 is a non-return valve 262, which prevents air from the ambient atmosphere from flowing into the radial opening 246 and hence into the working chamber 244. A flow of air in the opposite direction, i.e. a flow of air from the working chamber 244 through the radial opening 246 towards the ambient atmosphere may however pass substantially unimpeded through the non-return valve 262.

In operation, the pedal simulation device 210 according to FIG. 3 therefore behaves differently to the pedal simulation device 110 according to FIG. 2 in that, upon a resetting movement of the actuating rod 220 and hence of the working piston 236 in accordance with arrow $P_2$, the air contained in the working chamber 244 may pass substantially unimpeded into the ambient atmosphere, wherein the throttle device 250 is bypassed by means of the bypass line 260. This means that the brake pedal 12 may move under the action of the spring 26 and substantially without damping by the throttle device 250 relatively quickly into its normal position. On the other hand, the throttle device 250 in the second embodiment according to FIG. 3 acts in the same way as the embodiment according to FIG. 2 because, when air from the ambient atmosphere is taken into the working chamber 244, the non-return valve 262 closes and prevents a flow of air through the bypass line 260.

Figure 4:
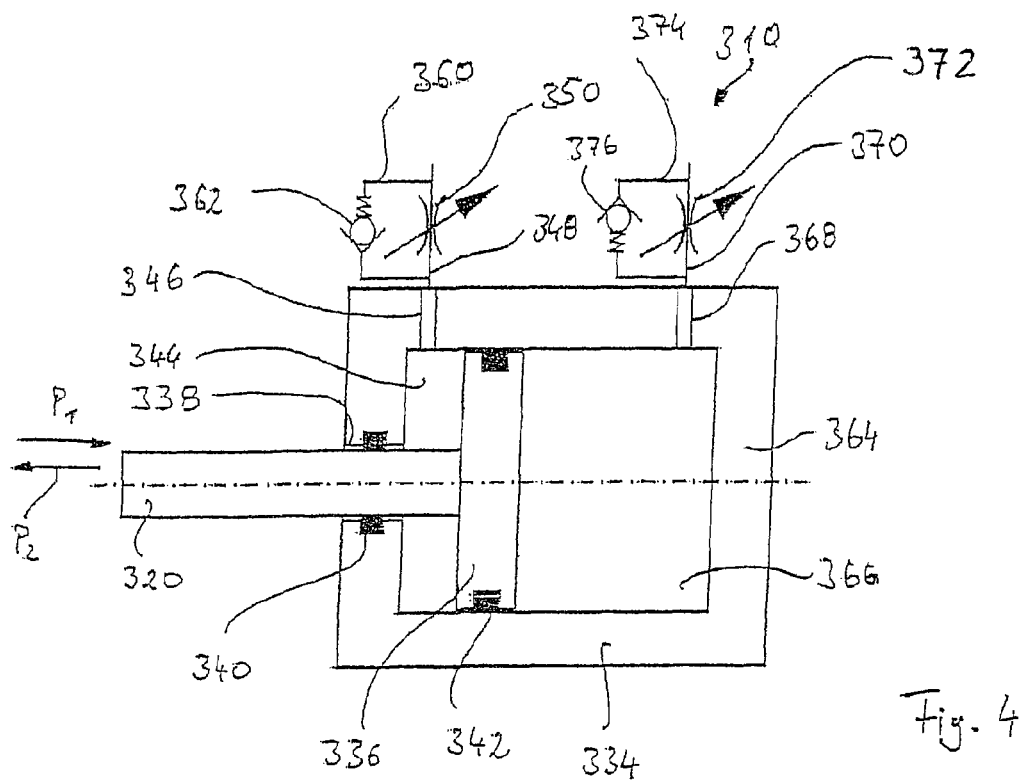
FIG. 4 is a detail view as in FIGS. 2 and 3 according to a third embodiment of the present invention.

FIG. 4 shows a third embodiment of the pedal simulation device 310 according to the invention. The same reference characters are used for the identical or equivalent components as with regard to FIGS. 1 to 3, only with the number "3" placed in front.

The third embodiment according to FIG. 4 differs from the second embodiment according to FIG. 3 in that the cylinder 334 is no longer open at one end but is closed at its end remote from the actuating rod 320 by the end wall 364. In the cylinder 334 there is therefore, in addition to the working chamber 344, a complementary working chamber 366 that is delimited at one end by the working piston 336. Opening into this complementary working chamber 366 close to the end wall 364 is a further radial opening 368. The radial opening 368 communicates with a fluid line 370, which comprises, on the one hand, a throttle channel with an adjustable throttle device 372 and, on the other hand, a bypass channel 374 with a non-return valve 376. The non-return valve 376 is disposed in such a way that it allows air from the ambient atmosphere to flow unimpeded through the bypass line 374, via the radial opening 368 and into the complementary working chamber 366 but prevents air from flowing out of the complementary working chamber 366 through the radial opening 368. The effect of this is that, upon a movement of the actuating rod 320 and the working piston 336 in the direction of arrow $P_1$, the air contained in the complementary working chamber 366 has to flow through the throttle device 372 and so the outward flow is damped by means of the throttle device 372. Upon a movement of the actuating rod 320 and the working piston 336 in accordance with arrow $P_2$, on the other hand, air from the ambient atmosphere may pass substantially unimpeded through the non-return valve 376, via the radial opening 368 and into the complementary working chamber 366, so that this movement is substantially not damped and/or inhibited by the throttle device 372.

Compared to the pedal simulation devices according to FIGS. 2 and 3, the pedal simulation device according to FIG. 4 presents a reaction behavior upon the brake pedal 12 that differs in that, with increasing displacement distance of the working piston 336 inside the cylinder 334, the pressure inside the complementary working chamber 366 rises more and more. The effect of this is that, when the rise of the vacuum in the working chamber 344 levels off with increasing displacement distance of the working piston 336, as explained with regard to curve 152 in FIG. 6, the effect of the complementary working chamber 366, in which an above-atmospheric pressure builds up, is utilized. As a result, the resistance force reacting upon the brake pedal 12 increases perceptibly for the driver even with increasing displacement movement of the working piston 336.

In other words, the pedal simulation device 310 according to FIG. 4 presents a relatively fast response, wherein even in the event of extreme and/or sustained actuation of the brake pedal with sufficiently high brake actuating force $F_B$ and correspondingly high brake pedal displacement the resistance reacting upon the brake pedal continues to increase perceptibly.

Figure 5:
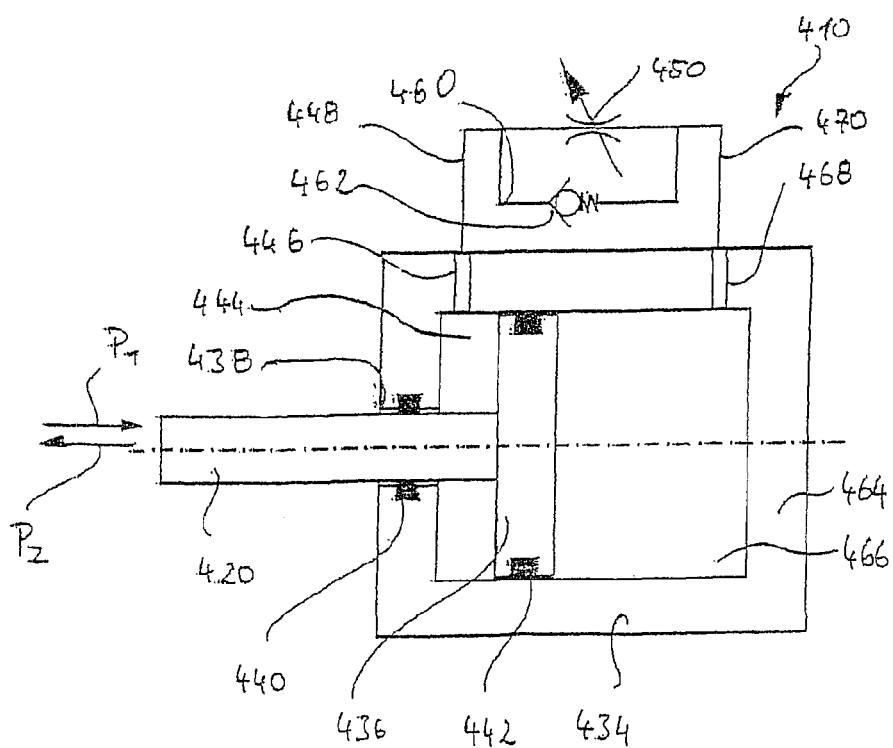
FIG. 5 is a detail view as in FIGS. 2 to 4 according to a fourth embodiment of the present invention.

Finally, FIG. 5 shows a fourth embodiment of the pedal simulation device 410 according to the invention. For the description of this embodiment, the previously used reference characters are used once more for components of an identical type or an identical effect, only with the number "4" placed in front.

The fourth embodiment according to FIG. 5 differs from the third embodiment according to FIG. 4 only in that the two fluid lines 448 and 470 are connected to one another, wherein these fluid lines have a common throttle device 450 and a common bypass channel 460 having the non-return valve 462 for bypassing the throttle device 450. The effect of this construction is that upon a movement of the actuating rod 420 and the working piston 436 in accordance with arrow $P_1$—without an exchange of air with the ambient atmosphere—air from the complementary working chamber 466 is sucked through the radial opening 468, the throttle device 450 and the radial opening 446 into the working chamber 444. This occurs in a throttled manner, wherein the non-return valve 462 closes so that no air flow may occur through the bypass channel 460. Such a movement of the actuating rod 420 in accordance with arrow $P_1$ is therefore damped. Upon a movement in the opposite direction in accordance with arrow P2, on the other hand, air from the working chamber 444 is pressed through the radial opening 446 into the fluid line 448. Given this flow direction of the air, the non-return valve 462 opens so that the air, while substantially bypassing the throttle device 450, flows into the fluid line 470 and the radial opening 468 and through the latter into the complementary working chamber 466. The pedal simulation device 410 according to the fourth embodiment according to FIG. 5 therefore presents a similar reaction behavior upon the brake pedal 12 to the pedal simulation device 210 according to FIG. 3. One advantage of the fourth embodiment according to the invention according to FIG. 5 is that it is a closed pneumatic system that is not exposed to pollution by incoming ambient air.

It should be pointed out that the embodiments described above with reference to FIGS. 2 to 6 may be combined with one another in any desired manner to produce different characteristic curves of the reaction behavior.

It was explained above that the invention may be used to provide pedal simulation devices of differing design, which react relatively fast to an actuation of the brake pedal. It should be pointed out that the adjustable throttle devices used may be adjustable manually during assembly and during maintenance. It is also equally possible for these throttle devices during operation of the brake system to be permanently, e.g. electro-mechanically controllable in order to vary their throttling behavior and hence the behavior of the pedal simulation device. It is therefore possible, for example, to switch between a sporty setting, in which the pedal has a relatively rapid, strong response, and a moderate setting, in which the pedal has a slightly retarded and relatively gentle response. It should moreover be pointed out that, as already indicated several times above, the throttle devices according to the present invention are used primarily to damp the piston movement upon an actuation of the brake pedal but that, as was also explained with reference to FIG. 2, during a return travel movement of the working piston, i.e. during a resetting movement, these throttle devices may equally demonstrate a throttling action and may therefore also damp this movement.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Pedal simulation device for simulating the reaction behaviour of a pedal, in particular of a brake pedal of a vehicle brake system, comprising:
    a cylinder;
    a piston disposed displaceably inside the cylinder and coupled to the pedal and delimiting a working chamber inside the cylinder;
    a resetting element capable of exerting a resetting force on the pedal; and
    a modeling device, which is fluidically connected to the working chamber for influencing the reaction behaviour of the pedal;
    wherein the modeling device connects the working chamber to the ambient atmosphere; and
    wherein, upon an actuation of the pedal, a vacuum builds up in the working chamber.

2. Pedal simulation device according to claim 1, wherein the modeling device comprises at least one throttle channel having a throttle device.

3. Pedal simulation device according to claim 2, wherein the throttle device is adjustable.

4. Pedal simulation device according to claim 2, wherein the modeling device comprises a bypass channel that bypasses the throttle channel.

5. Pedal simulation device according to claim 4, wherein, upon a release of the pedal after actuation thereof, under the action of the resetting element fluid flows out of the working chamber through the bypass channel.

6. Pedal simulation device according to claim 4, wherein the bypass channel comprises a non-return valve, which allows fluid to pass substantially unimpeded out of the working chamber and prevents fluid from passing into the working chamber.

7. Pedal simulation device according to claim 1, wherein the cylinder is closed at its end remote from the working chamber and together with the piston encloses a complementary working chamber and that, upon an actuation of the pedal, fluid flows out of the complementary working chamber through the modeling device.

8. Pedal simulation device according to claim 7, wherein the modeling device connects the complementary working chamber to the ambient atmosphere.

9. Pedal simulation device according to claim 7, wherein the modeling device connects the complementary working chamber to a fluid reservoir that is separated or separable from the ambient atmosphere.

10. Pedal simulation device according to claim 7, wherein the modeling device comprises at least one throttle channel associated with the complementary working chamber and having a throttle device.

11. Pedal simulation device according to claim 10, wherein the throttle device associated with the complementary working chamber is adjustable.

12. Pedal simulation device according to claim 10, wherein the modeling device comprises a bypass channel, which is associated with the complementary working chamber and bypasses the throttle device associated with the complementary working chamber.

13. Pedal simulation device according to claim 12, wherein, upon a release of the pedal after actuation thereof, under the action of the resetting element fluid flows through the bypass channel into the complementary working chamber.

* * * * *